United States Patent

Chour et al.

[11] Patent Number: 5,319,439
[45] Date of Patent: Jun. 7, 1994

[54] STATIONARY WAVE INTERPOLATOR

[75] Inventors: Matthias Chour, Jena; Mario Netzel, Braunsbedra, both of Fed. Rep. of Germany

[73] Assignee: Carl Zeiss JENA GmbH, Jena, Fed. Rep. of Germany

[21] Appl. No.: 838,712

[22] PCT Filed: Jul. 12, 1991

[86] PCT No.: PCT/EP91/01311
§ 371 Date: Mar. 12, 1992
§ 102(e) Date: Mar. 12, 1992

[87] PCT Pub. No.: WO92/01207
PCT Pub. Date: Jan. 23, 1992

[30] Foreign Application Priority Data

Jul. 13, 1990 [DE] Fed. Rep. of Germany ......... 342758

[51] Int. Cl.⁵ .................................................. G01B 9/02
[52] U.S. Cl. ...................................... 356/345; 356/4.5; 356/349
[58] Field of Search ............... 356/345, 349, 358, 363, 356/351, 4.5

[56] References Cited

U.S. PATENT DOCUMENTS 3,788,746 1/1974 Baldwin et al. .
4,566,794 1/1986 Hanse .

FOREIGN PATENT DOCUMENTS 0132143 1/1985 European Pat. Off. .
0316093 5/1989 European Pat. Off. .

Primary Examiner—Samuel A. Turner
Attorney, Agent, or Firm—McAulay Fisher Nissen Goldberg & Kiel

[57] ABSTRACT

In a stationary wave interpolator for detecting very rapid movements of objects with high resolution in real-time operation, the mode distance frequency of a laser is fed to a first conductive path and the mode distance frequency plus/minus the Doppler shift is fed to a second conductive path. The two conductive paths are connected by double balanced mixers which are connected in parallel, whose reference inputs are connected to the first conductive path and whose measurement inputs are connected to the second conductive path. The outputs of the double balanced mixers are connected to a digital discriminator for decoupling a phase-shifted Doppler frequency.

8 Claims, 2 Drawing Sheets

STATIONARY WAVE INTERPOLATOR

BACKGROUND OF THE INVENTION a) Technical Field

The present invention is directed to a stationary wave interpolator in which two conductive paths are connected in each instance with a series connection comprising a photodiode, a hybrid amplifier and a double-hole core, in which the photodiode assigned to the first conductive path is provided for detecting the mode distance frequency of a laser and the photodiode assigned to the second conductive path is provided for detecting the mode distance frequency plus/minus the Doppler shift of an interferometer, in which the first conductive path is covered by an angle grid having a grid measurement which increases gradually and beginning with a starting angle and ending with an ending angle, and in which all component elements and connections are arranged on a carrier as dielectric material.

The invention is applicable in any measurement technique. It is useable in an advantageous manner particularly where high speeds of objects, e.g. rotational and translational movements at ultra-precision processing machinery, occur at high incremental resolutions.

b) Background Art

All known solutions for carrier frequency methods allow only a low object displacement speed, e.g. approximately 50 mm/s at $\lambda/256$, because of the low carrier frequency of the Zeeman He-Ne laser with approximately 2 MHz at high interpolation rates. Accordingly, resolutions of $\lambda/1024$ at an object displacement speed of 100 mm/s cannot be realized. Further, increasing the resolution by multiplying the carrier frequency involves a very high expenditure on circuitry (as demonstrated in U.S. Pat. No. 3,788,746), wherein no real-time processing is possible in rapid systems. Further, solutions are known in which disadvantageous transit time effects (delays) occur with reversal of direction of the object because of a control deviation of the phase regulating loop caused by hysteresis. Accordingly, it is not possible to increase the resolution in real-time processing, since an A/D signal conversion time (interpolation) leads to disadvantages (serial data evaluation).

SUMMARY OF THE INVENTION

The invention has, as a primary object, providing a stationary wave interpolator which enables a high resolution in real-time operation in rapid systems (parallel signal processing).

This object is met, according to the invention, in a stationary wave interpolator in that a plurality of double balanced mixers are connected by their reference input to a first conductive path, in that the reference input of a first double balanced mixer is guided so as to be localized at the location of the starting angle of the first conductive path, in that other double balanced mixers are connected to the first conductive path by their reference inputs so as to be localized at a distance of the increasing grid measurement until the ending angle, in that the double balanced mixers are connected to the second conductive path by their measurement input, and in that the outputs of the double balanced mixers are connected to a digital discriminator for decoupling a phase-shifted Doppler frequency. This provides the possibility of parallel evaluation, e.g. via ASIC. The double balanced mixers are preferably constructed as conventional hybrid networks which allow differential frequencies of two input frequencies to be transmitted.

The dielectric material is advantageously a ceramic work material.

In an advantageous further development of the invention, the conductive paths are constructed as arc-shaped strip lines which are divided into portions corresponding to the grid. The carrier also preferably has an arc-shaped cross section corresponding to the arc shape of the conductive paths.

The first conductive path should advantageously have a length corresponding to the value $\lambda/2$ of the mode distance frequency.

In the invention, at least two double balanced mixers are to be provided which are coupled with the first conductive path by their reference inputs in the grids and correspond to the angles 0° and 90°. However, it is particularly preferred that the coupling be effected in grids which are equivalent to angles of 5.625° or 11.25°.

A further advantageous construction of the invention also consists in that the second conductive path is designed as a symmetrical strip line network.

When operating the arrangement according to the invention, the photodiode assigned to the first conductive path detects a mode distance frequency $f_1$; $f_2$ originating from a laser. The photodiode of the second conductive path detects a mode distance frequency plus/minus the Doppler shift $f_1$; $f_2 \pm \Delta f_2$ which is fed into the measurement channel from the interferometer. The amplitudes of the photodiode output signals are increased in each instance via the hybrid amplifiers connected downstream, so that the subsequent double-hole cores are operated in saturation (amplitude stabilization). Stabilization can also be achieved by a diode constant current.

The amplified and thus stabilized signals are fed via the conductive paths to the double balanced mixers, mixed in the latter and then fed to the digital discriminator for evaluation in real-time operation as parallel processed signals.

The photodiodes are advantageously constructed as avalanche diodes.

The substantial advantages of the invention consist in that the double balanced mixers are exactly assigned to the phase angle of the standing wave formed on the first conductive path so that a high resolution is possible in real-time operation in fast systems, particularly in laser path measurement systems. Rapid movements of objects can be detected using relatively simple means.

For a better understanding of the present invention, reference is made to the following description and accompanying drawings while the scope of the invention will be pointed out in the appended claims.

Figure 1:
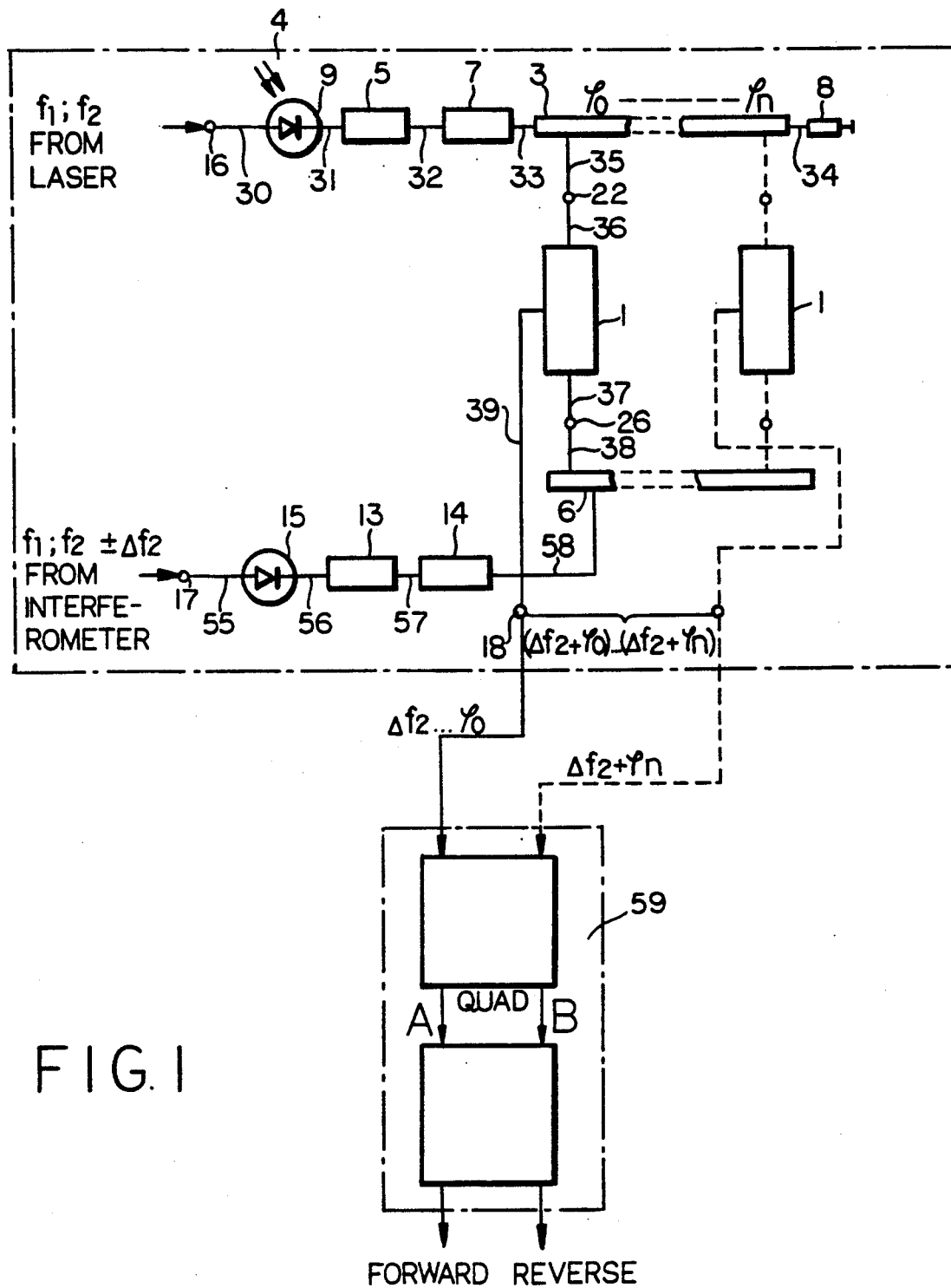
FIG. 1 shows a basic wiring diagram for a stationary wave interpolator according to the invention.

The reference numbers in the drawing have the following meanings:

| | |
|---|---|
| 1 | double balanced mixers |
| 3 | first conductive path |
| 4 | carrier |
| 6 | second conductive path |

-continued

| | |
|---|---|
| 5, 13 | hybrid amplifiers |
| 7, 14 | double-hole cores |
| 8 | resistor |
| 9, 15 | photodiodes |
| 16, 17 | inputs |
| 18, 19, 20, 21 | outputs |
| 22, 23, 24, 25 | reference inputs |
| 26, 27, 28, 29 | measurement inputs |
| 30 to 58 | electrical connections |
| 59 | phase discriminator |
| $\phi_{0,1,2...n}$ | interpolation angles |
| $f_1; f_2$ | mode distance frequency |
| $f_1; f_2 \pm \Delta f_2$ | mode distance frequency plus/minus the Doppler shift |
| A Quad B | signal output for computer coupling |
| forward, reverse | counting chain forward, reverse |

PREFERRED EMBODIMENTS OF THE PRESENT INVENTION

The basic connection arrangement of the stationary wave interpolator, according to the invention, according to FIG. 1 comprises a series connection of a photodiode 9, a hybrid amplifier 5 and a double-hole core 7 whose output is connected, via a line 33, with a first conductive path 3 which is connected to ground potential by its other end via a line 34 and a resistor 8.

Another series connection comprising a photodiode 15, a hybrid amplifier 13 and a double-hole core 14 is connected, via a line 58, with a second conductive path 6. The first conductive path 3 is provided with an angle grid from $\phi_0$ to $\phi_n$, wherein the starting angle $\phi_0$ can be freely selected and fixed. The grid ends at an ending angle $\phi_n$ with a grid measurement which increases gradually in increments of $\Delta\phi$. The increase $\Delta\phi$ corresponds to the angle or the distance between two adjacent grids, e.g. $\phi_0$ and $\phi_1$.

The two conductive paths 3, 6 can be constructed in an arc-shaped (i.e. curvature with finite radius, vertical to the drawing plane) or planar manner (i.e. curvature with infinite radius). Similarly, a carrier 4 of dielectric material on which all component elements and connections are arranged is provided with an outer surface which is either curved or planar, so that it has an arc-shaped cross section.

The conductive paths 3, 6 are connected by a plurality of double balanced mixers 1 connected in parallel whose reference inputs 22 are connected with the first conductor path 3, wherein a first double balanced mixer 1 is coupled with its input 22 at the starting angle $\phi_o$. Since at least two double balanced mixers 1 are to be provided in order to realize the invention, the second double balanced mixer 1 is to be coupled with its reference input 22 at location $\phi_n$. The double balanced mixers 1 further comprise measurement inputs 26 which are connected with the second conductive path, as well as outputs 18 which are connected to a digital discriminator 59 comprising a linking of sixteen comparators and exclusive-OR gates, the signals A Quad B being available at the output of the latter. The A-Quad-B signal output can be provided as an interface for the computer coupling. Moreover, the digital discriminator 59 supplies counting chains for the forward-reverse counter or a similar information converter supplying the measurement value.

Practical construction of the invention is possible with the described circuit arrangement according to the principle.

Figure 2:
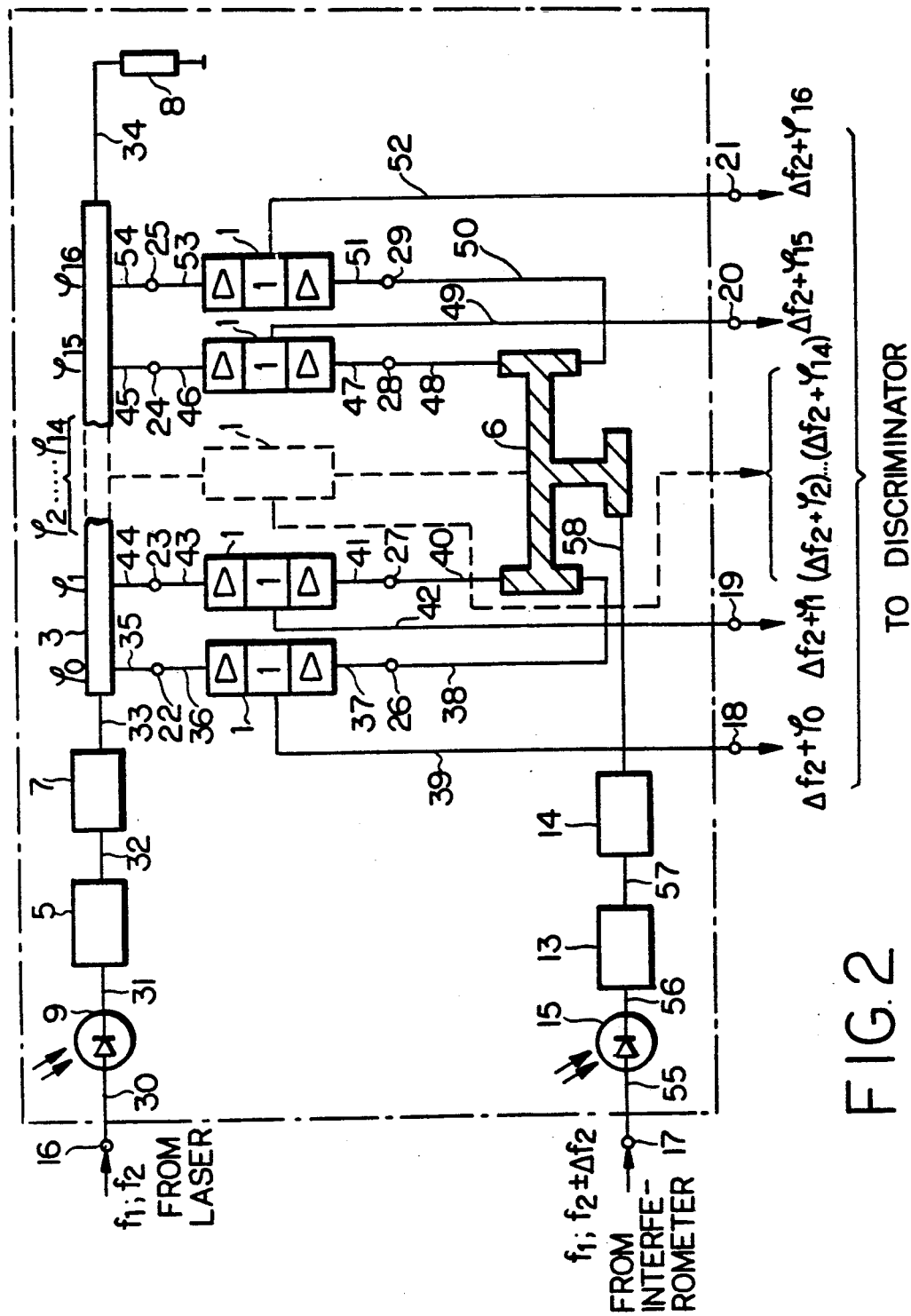
FIG. 2 shows the circuit of an advantageous realization of the invention.

FIG. 2 shows the invention in a particularly advantageous embodiment form. The conductive paths 3, 6 are connected in this instance by sixteen double balanced mixers 1 connected in parallel. In accordance with this quantity, the grid measurement on the conductive path 3 has an amount $\Delta\phi = 11.25°$ at $\phi_o = 0°$ and $\phi_{16} = 169.75°$. The conductive path 3 is constructed as a strip line having a length corresponding to the value $\lambda/2$ of the mode distance frequency $f_1$; $f_2$ of the laser. The second conductive path 6 is designed as a symmetrical strip line network which connects the measurement inputs 26, 27, 28, 29 of the shown double balanced mixers 1 as well as the other measurement inputs of the double balanced mixers 1 which are not shown in FIG. 2.

In operating the arrangement a mode distance frequency $f_1$, $f_2$ originating from the laser is detected by the photodiode 9 which is constructed in the shown example as an avalanche diode, while the photodiode 15, likewise an avalanche diode, receives the mode distance frequency plus/minus the Doppler shift $f_1$; $f_2 \pm \Delta f_2$ coming from an interferometer in the measurement channel. The diode bias voltages are selected in such a way that the two photodiodes 9, 15 work in the maximum range. The hybrid amplifiers 5, 13 connected downstream increase the signal amplitude so that the following double-hole cores 7, 14 are operated in saturation (amplitude regulation). Accordingly, it is possible that the laser drift capacity can fluctuate by at least an order of magnitude and that the plane mirror in the measurement system upstream can be tilted more sharply compared with conventional laser path measurement systems.

The amplified and regulated signals $f_1$; $f_2$ and $f_1$; $f_2 \pm \Delta f_2$ are fed to the double balanced mixers 1 via the conductive paths 3, 6, wherein the signal $f_1$; $f_2$, corresponding to the grid in each instance, is connected to the reference inputs 22, 23, 24, 25 of the shown double balanced mixers 1 and the other reference inputs of the double balanced mixers 1 which are not shown, and the signal $f_1$; $f_2 \pm \Delta f_2$ reaches the measurement inputs of the double balanced mixers 1 via the conductive path 6. The signals are mixed in the double balanced mixers 1.

Sixteen signals from $\Delta f_2 + \phi_0$ to $\Delta f_2 + \phi_{16}$ are tapped at the outputs 18, 19, 20, 21 of the shown double balanced mixers 1 and at the other outputs of the double balanced mixers, not shown in FIG. 2, in parallel with the corresponding phase shifts in real-time operation as a function of the displacement of the object to be measured (measurement mirror, not shown in the drawing) and are fed to the digital discriminator 59 for evaluation. The sign of the Doppler frequency $\pm \Delta f_2$ is determined and counting chains which are correct with respect to the sign are prepared.

The double balanced mixers 1 supply an alternating signal without a d.c. component, which signal is triggered in the zero point of the amplitude. Amplitude disturbances, e.g. brought about by maladjustment of an optical system connected prior to the stationary wave interpolator or by tilting of the measurement mirror in this system, do not have a disruptive effect. In super-rapid and high-resolution systems, the amplitude is regulated via a second gate of the dual-gate transistors of the hybrid amplifiers 5, 13. Evaluation circuits which correct the zero point are to be used if necessary during fluctuations of the zero point of the double balanced mixer 1 during fast movements of the measurement mirror. The mixer output frequency of zero Hertz is allowed when the object to be measured is stationary. A correction of nonlinear transit time errors is possible by dividing the Doppler frequency $\pm\Delta$ $f_2$ into intervals and varying the divisor factor in each interval.

While the foregoing description and drawings represent the preferred embodiments of the present invention, it will be obvious to those skilled in the art that various changes and modifications may be made therein without departing from the true spirit and scope of the present invention.

What is claimed is:

1. A stationary wave interpolator comprising: two conductive paths each connected with a series connection including a photodiode, a hybrid amplifier, and a double-hole core; said photodiode assigned to the first conductive path being provided for detecting the mode distance frequency of a laser and said photodiode assigned to the second conductive path being provided for detecting the mode distance frequency plus/minus the Doppler shift of an interferometer, said first conductive path being covered by an angle grid which starts at a starting angle ($\phi_0$) and ends with a gradually increasing grid measurement at an ending angle ($\phi_n$), all component elements and connections of said interpolator being arranged on a carrier of dielectric material; a plurality of double balanced mixers, having reference time inputs and reference inputs, being connected to the first conductive path by their reference time input; the reference input of a first double balanced mixer being guided so as to be localized at the location of the starting angle ($\phi_0$) of the first conductive path; said other double balanced mixers being connected to the first conductive path by their reference inputs at a distance of the increasing grid measurement up to an ending angle ($\phi_n$); said double balanced mixers being connected to the second conductive path by their measurement input; and said outputs of the double balanced mixers being connected to a digital discriminator for decoupling a phase-shifted Doppler frequency.

2. Stationary wave interpolator according to claim 1, wherein a ceramic work material is used as dielectric material.

3. Stationary wave interpolator according to claim 1, wherein the conductive paths are constructed as arc-shaped strip lines.

4. Stationary wave interpolator according to claim 3, wherein the carrier has an arc-shaped cross section.

5. Stationary wave interpolator according to claim 1, wherein the first conductive path is provided with a length corresponding to the value $\lambda/2$ of the mode distance frequency.

6. Stationary wave interpolator according to claim 1, wherein the photodiodes are constructed as avalanche diodes.

7. Stationary wave interpolator according to claim 1, wherein the second conductive path is designed as a symmetrical strip line network.

8. Stationary wave interpolator according to claim 1, wherein the double balanced mixers comprise measured hybrid modules.

* * * * *